United States Patent [19]
Lindquist et al.

[11] Patent Number: 4,667,281
[45] Date of Patent: May 19, 1987

[54] SPEED-UP CIRCUIT FOR SWITCHED POWER TRANSISTOR

[75] Inventors: John Lindquist, Larkspur, Calif.; Dahya Patel, Horndean, England

[73] Assignee: Universal Manufacturing Corp., Paramus, N.J.

[21] Appl. No.: 798,264

[22] Filed: Nov. 15, 1985

[51] Int. Cl.⁴ .............................................. H02P 13/26
[52] U.S. Cl. ..................................... 363/89; 363/126; 323/289; 307/280; 307/300
[58] Field of Search .................. 363/89, 126; 307/270, 307/280, 300; 323/289

[56] References Cited

U.S. PATENT DOCUMENTS

| 3,733,540 | 5/1973 | Hawkins | 363/89 |
| 4,220,987 | 9/1980 | Rao et al. | 323/289 X |
| 4,312,029 | 1/1982 | Zellmer | 323/289 X |
| 4,437,148 | 3/1984 | Suranyi | 363/89 |

Primary Examiner—Peter S. Wong
Attorney, Agent, or Firm—Darby & Darby

[57] ABSTRACT

A circuit is provided to speed up switching of a capacitively coupled power transistor driven with a signal provided from a pulse width modulator. The speed-up circuit is provided across a buffer amplifier which is in series circuit between the pulse width modulator and the coupling capacitor. The speed-up circuit includes a time delay circuit which is activated when the output of the amplifier goes low. The delay circuit is coupled to actuate a clamp circuit at a predetermined interval after activation. The clamp circuit is connected to the input of the amplifier and, upon actuation, pulls up the voltage at the input of the amplifier so that it is at a level intermediate the extreme values of the pulse width modulator output signal. In a preferred embodiment the timer is a series RC charging circuit and the clamp is a transistor with its base connected to the junction between the capacitor and the resistor. The collector of the transistor is coupled to the input of the amplifier and its emitter is connected to a voltage source through a zener diode.

10 Claims, 2 Drawing Figures

SPEED-UP CIRCUIT FOR SWITCHED POWER TRANSISTOR

FIELD OF THE INVENTION

The present invention relates to a circuit for improving the switching speed of a capacitively coupled, transformer base drive for a switched power transistor, and it finds particular application in pulse width modulated systems, such as those used in switching regulators for power supplies.

BACKGROUND OF THE INVENTION

A common circuit configuration for a switching regulated power supply utilizes an output power transistor in a common base configuration, with the regulated output voltage being derived at the emitter of the power transistor. Typically, the base of the transistor is driven by a transformer, to which the output of a pulse width modulator is capacitively coupled. The pulse width control input of the pulse width modulator is then coupled to the regulated output of the power supply so as to compensate for variations in the regulated output voltage.

Capacitive coupling between the pulse width modulator and the drive transformer makes it difficult to switch the power transistor rapidly. Under normal operation, the power transistor is periodically switched in and out of saturation. Owing to the capacitive coupling of the pulse width modulator, the negative swing of the signal applied to the drive transformer is very small, when the output signal of the pulse width modulator is at a low duty cycle. As a result, very little reverse drive is available at the base of the power transistor to drive it out of saturation, and the power transistor turns off very sluggishly. This results in excessive power consumption and also presents a substantial limitation on the degree of regulation provided by the power supply.

Broadly, it is an object of the present invention to overcome the disadvantages inherent in prior art switching regulators utilizing a capacitively coupled pulse width modulator. It is specifically contemplated that the invention provide substantial reverse drive to the power transistor so as to minimize the switching delays resulting from the charge storage time associated with saturation of the transistor.

It is also an object of the present invention to provide circuit means for improving the switching speed of the power transistor, which circuit means is readily retrofitted into existing switching regulated power supplies, is convenient and reliable in use, yet relatively simple and inexpensive construction.

In accordance with an illustrative embodiment demonstrating objects and features of the present invention, an active speed-up circuit is provided across a buffer amplifier which is in series circuit between the pulse width modulator and coupling capacitor. The speed up circuit includes a time delay circuit which is activated when the output of the amplifier goes low. The delay circuit is coupled to actuate a clamp circuit at a predetermined interval after actuation. The clamp circuit is connected to the input of the amplifier and, upon actuation, pulls up the voltage at the input of the amplifier so that it is at a level intermediate the extreme values of the pulse width modulator output signal.

In a preferred embodiment, the timer is an series RC charging circuit and the clamp is a transistor with its base connected to the junction between the capacitor and the resistor. The collector of the transistor is coupled to the input of the amplifier and its emitter is connected to a voltage source through a zener diode.

BRIEF DESCRIPTION OF THE DRAWING

The foregoing brief description, as well as further objects, features and advantages will best be understood from the following detailed description of a presently preferred, but nonetheless illustrative, embodiment of the present invention, with reference being had to the accompanying drawing, in which.

DETAILED DESCRIPTION OF THE PREFERRED EMBODIMENT

Figure 1:
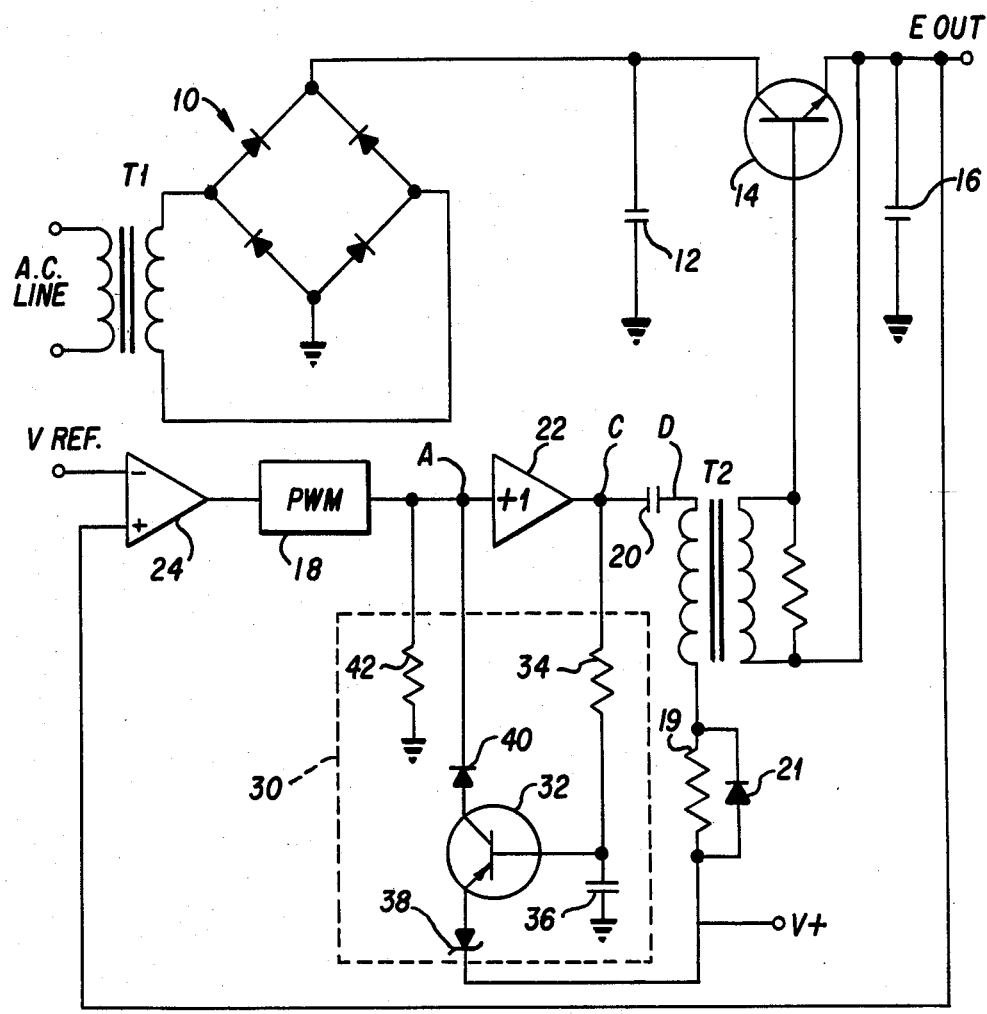
FIG. 1 is a schematic diagram of a switching regulated power supply incorporating objects and features of the present invention.

Turning now to the details of the disclosure, FIG. 1 is a simplified schematic diagram of a switching regulated power supply incorporating the present invention.

Power is coupled from the AC line through a transformer, T1, the output of which is provided to a conventional diode bridge 10 for full wave rectification. Typically the rectified output is applied across a capacitor 12 which, preferably, does not store significant amounts of energy, in order to maintain a high power factor.

This rectified signal is then applied to the collector of power transistor 14, which is in a common base configuration. The emitter of transistor 14 provides the regulated output $E_{OUT}$ at a relatively low impedance level. Typically, $E_{OUT}$ is provided across a large capacitor 16, in order to minimize voltage ripple.

The base drive to the transistor 14 is provided through a transformer T2. The transformer T2 is, in turn, driven with the output of a pulse width modulator 18, which is coupled to the transformer T2 through the coupling capacitor 20. In series with the primary of transformer T2, there is also provided the parallel combination of a resistor 19 and a diode 21. The value of resistor 19 is selected to set or limit the current flowing in the primary when transistor 14 is on, and diode 21 is oriented to turn on when the current in the primary is reversed. Since the forward biased diode presents a low impedance across resistor 19, the current limiting effect of the resistor is eliminated and substantially more reverse current flows than would otherwise be possible. This reduces the "storage time" delay in turning off transistor 14 (discussed further below). It is also common to provide the output of the pulse width modulator through a buffer amplifier 22.

Pulse width modulator 18 is a conventional circuit element. Preferably, it is a SG3524 switching regulator, which is available from Signetics Corporation. If this circuit is used then it is unnecessary to include the differential amplifier 24 discussed below, since the Signetics device has a differential input capability.

In order to achieve switching regulation, the duty cycle of pulse width modulator 18 is controlled by the regulated voltage $E_{OUT}$. Specifically, an error signal is generated by applying $E_{OUT}$ and a reference voltage $V_{REF}$ to a differential amplifier 24, and this error signal controls the duty cycle of pulse width modulator 18. This results in a feedback loop which provides the switching regulation.

Figure 2:
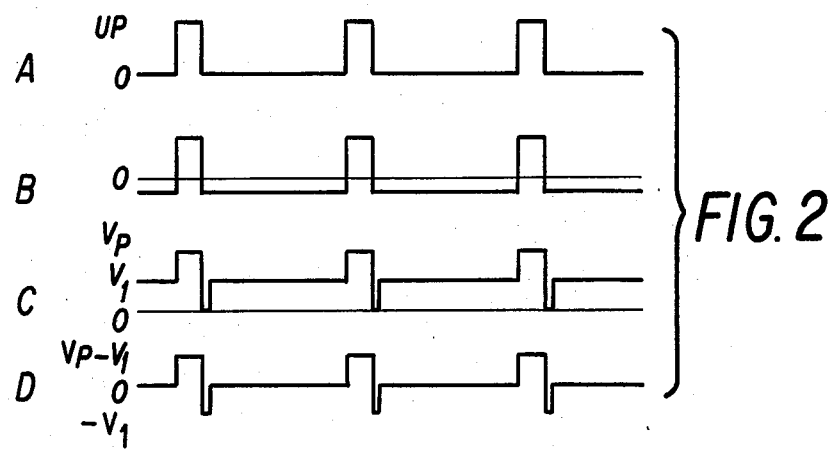
FIG. 2 is a series of timing wave forms useful in explaining the operation of the circuit of FIG. 1.

The portion of FIG. 1 described thus far represents the configuration of a conventional switching regulator. Referring to FIG. 2, there are provided a series of wave forms which are helpful in understanding the operation of the circuit of FIG. 1. For clarity, the same letters that represent the wave forms in FIG. 2 are included in FIG. 1 where the respective wave form occurs. Wave form A represents a typical output from pulse width modulator 18. This signal varies from a minimum voltage of 0 to a peak voltage of $V_P$. Wave form A has an average or DC value equal to the product of $V_P$ and the duty cycle. Coupling capacitor 20 is charged to the difference between V+ and this average value of wave form A, so that the voltage across the primary of transformer T2 (the left hand winding) has a net negative offset voltage as compared with wave form A. This voltage across the primary, represented by wave form B, is coupled through the transformer as the base-to-emitter drive of transistor 14.

By design, the positive peaks of wave form B drive transistor 14 into saturation. The negative excursions of wave form B tend to back bias the base-emitter junction of transistor 14, and therefore turn the transistor off. However, since the transistor was previously driven into saturation, it will not turn off until all the excess charge is swept out of the base-emitter junction. This results in the well-known "storage time" delay encountered with saturating transistor switches. This delay is dependent upon the amount of time required to withdraw the excess charge from the base-emitter junction of the transistor. At low duty cycles the average value of the pulse width modulator output is quite low, and the negative excursion of wave form B is therefore quite low. Hence, a very small reverse drive is provided to the base-emitter junction of transistor 14. As a result, stored charge in the base-emitter junction of the transistor is removed very slowly and an excessive storage time delay is encountered.

It should also be apparent that the storage time of transistor 14, and therefore the speed of its switching into the off state, will be related to the duty cycle of the output of pulse width modulator 18. It would be desirable to make the switching times of transistor 14 independent of the signal provided by pulse width modulator 18.

A speed-up circuit embodying the present invention is enclosed within the dashed block 30 in FIG. 1. The speed-up circuit 30 includes a PNP transistor 32, the base of which is coupled through a resistor 34 to the output of buffer amplifier 22 and, through a capacitor 36, to ground. The emitter of transistor 32 is coupled through a zener diode 38 to the supply voltage V+, which may be derived from the regulated output voltage $E_{OUT}$. The collector of transistor 32 is coupled to the input of buffer amplifier 22 through a diode 40. The input of buffer amplifier 22 is also coupled to ground through a resistor 42.

In operation, transistor 32 is off when the output of pulse width modulator 18 is high. During this time, the output of amplifier 22 (wave form C) therefor remains at the high level.

When the output of pulse width modulator 18 goes low, the output of amplifier 22 follows. Consequently, capacitor 36 begins to be discharged through resistor 34. The voltage at the base of transistor 32 therefore begins to drop. When the voltage at the base of transistor 32 drops below a voltage $V_1$ defined by:

$V_1 = V^+ -$ zener diode voltage transistor 32 turns on. This causes the voltage at the output of pulse width modulator 18 to be clamped or pulled up to approximately $V_1$ (voltage drops across base-emitter junctions and forward biased diodes are ignored here and in the preceding discussion, since the voltage levels of interest are relatively high). The effect of operation of transistor 32 is to make wave form A appear essentially the same as wave form C. That is, the peak excursions of the wave form are maintained, but the average level is shifted essentially to $V_1$ and after each positive pulse, a negative pulse is produced, the duration of which is determined by the values of resistor 34 and capacitor 36.

As a result of the DC blocking action of capacitor 20, the drive signal produced across the primary of transformer T2 has approximately the appearance of wave form D. Actually, the wave form should have a slightly positive baseline, owing to the energy included in the pulses 50. However, for purposes of explanation, the wave form D serves as a sufficiently accurate representation. The most positive value of the wave form is equal to $V_P - V_1$, and the most negative excursion is to $-V_1$. Inasmuch as wave form D is coupled through transformer T2 and appears across a resistor, the current provided to transistor 14 will have a similar wave form.

In practice, the duration of the pulses 50 in wave form C (and therefore that of the negative pulses in wave form D) is selected so that the negative pulses in wave form D are effective in causing substantial charge to be drawn out of the base-emitter junction of transistor 14, so as to turn it off rapidly. The required duration of the pulses will depend upon the value of $V_1$, since it is the combined effect of pulse height and duration which achieves the removal of charge. As mentioned above, the duration is adjusted by proper selection of the values of resistor 34 and capacitor 36, since the RC circuit functions essentially as a timer.

Although a preferred form of the invention has been disclosed for illustrative purposes, those skilled in the art will appreciate that many additions, modifications, and substitutions are possible without departing from the scope and spirit of the invention as defined in the accompanying claims.

What is claimed is:

1. An electronic circuit for speeding up switching of a power transistor driven with a signal between its base and emitter, which signal has upper and lower extreme values and is provided from a pulse width modulator, through a coupling capacitor, said circuit comprising:
   amplifier means in a series circuit between the pulse width modulator and the coupling capacitor;
   time delay means responsive to an output signal from said amplifier;
   clamp circuit means coupled to be actuated by said delay means and connected to the input of the amplifier and, upon actuation, for pulling up the voltage at the input of the amplifier so that it is at a level intermediate the extreme values of the pulse width modulator output signal.

2. A circuit in accordance with claim 1 wherein the time delay means is a charging circuit including a resistor and capacitor connected in a series circuit between the output of the amplifier and a first voltage source, the clamp being a transistor with its base connected to the junction between the capacitor and the resistor, the collector of the transistor being coupled to the input of the amplifier and its emitter being connected to a second voltage source through means providing a predetermined voltage drop.

3. A circuit in accordance with claim 2 further comprising resistor means connected between said amplifier input and one of said first and second voltage sources.

4. A circuit in accordance with claim 2 wherein said voltage drop means is a zener diode.

5. A circuit in accordance with claim 2 wherein said fist and second voltage sources are the opposite terminals of a power supply.

6. A circuit in accordance with claim 2, wherein said collector is coupled to said amplifier input through rectifying means arranged to conduct current in the same direction as said collector when said transistor is on.

7. A circuit in accordance with claim 6, wherein said rectifying means is a diode.

8. A circuit in accordance with claim 6 further comprising resistor means connected between said amplifier input and one of said first and second voltage sources.

9. In combination with an electronic circuit for speeding up switching of a power transistor driven with a signal between its base and emitter, which signal has upper and lower extreme values and is provided from a pulse width modulator, through a coupling capacitor, said circuit being of the type including amplifier means in a series circuit between the pulse width modulator and the coupling capacitor; time delay means responsive to an output signal from said amplifier; clamp circuit means coupled to be actuated by said delay means and connected to the input of the amplifier and, upon actuation, for pulling up the voltage at the input of the amplifier so that it is at a level intermediate the extreme values of the pulse width modulator output signal:
   means providing a rectified signal from an a.c. line, said rectified signal being coupled to the collector of the power transistor and an output being derived at the emitter of the transistor,
   a source of a predetermined reference voltage,
   means differentially responsive to the reference voltage and the output at the emitter of the transistor to produce an error signal,
   the pulse width modulator having a control input for determining the pulse width of the output signal produced by the pulse width modulator,
   said error signal being coupled to said control input so as to vary pulse width in a manner to provide switching regulation at the emitter of the transistor.

10. In combination with an electronic circuit for speeding up switching of a power transistor driven with a signal between its base and emitter, which signal has upper and lower extreme values and is provided from a pulse width modulator, through a coupling capacitor, said circuit being of the type including amplifier means in a series circuit between the pulse width modulator and the coupling capacitor; time delay means responsive to an output signal from said amplifier; clamp circuit means coupled to be actuated by said delay means and connected to the input of the amplifier and, upon actuation, for pulling up the voltage at the input of the amplifier so that it is at a level intermediate the extreme values of the pulse width modulator output signal; wherein the time delay means is a charging circuit including a resistor and capacitor connected in a series circuit between the output of the amplifier and a first voltage source, the clamp is a transistor with its base connected to the junction between the capacitor and the resistor, the collector of the transistor being coupled to the input of the amplifier and its emitter being connected to a second voltage source through means providing a predetermined voltage drop:
   means providing a rectified signal from an a.c. line, said rectified signal being coupled to the collector of the power transistor and an output being derived at the emitter of the transistor,
   a source of a predetermined reference voltage,
   means differentially responsive to the reference voltage and the output at the emitter of the transistor to produce an error signal,
   the pulse width modulator having a control input for determining the pulse width of the output signal produced by the pulse width modulator,
   said error signal being coupled to said control input so as to vary pulse width in a manner to provide switching regulation at the emitter of the transistor.

* * * * *